Dec. 12, 1933.　　　W. H. JOHNSON　　　1,938,594
SPEED CHANGE DEVICE
Filed April 8, 1931　　　7 Sheets-Sheet 1
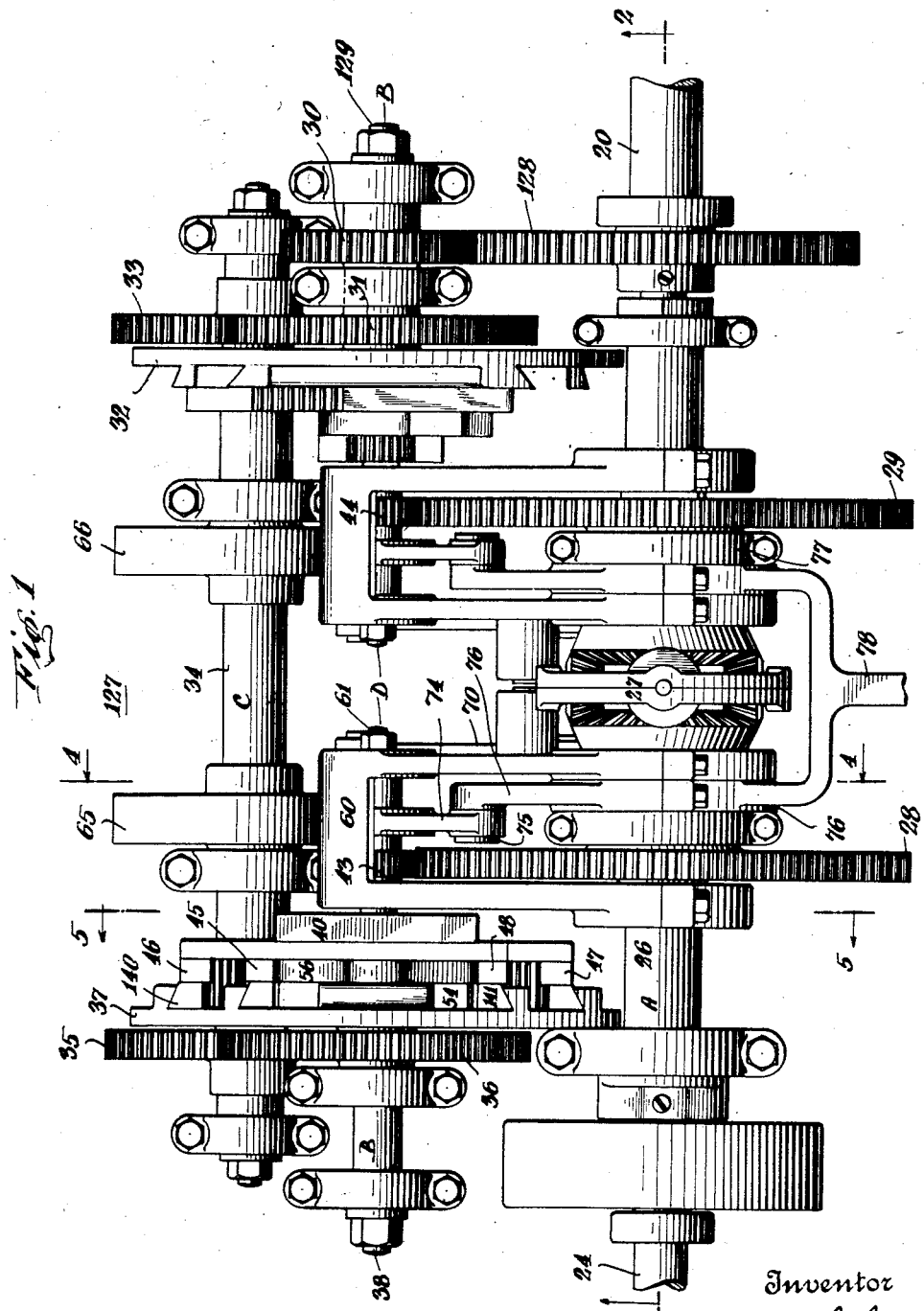
Inventor
William Horace Johnson
By his Attorneys
Austin + Dix

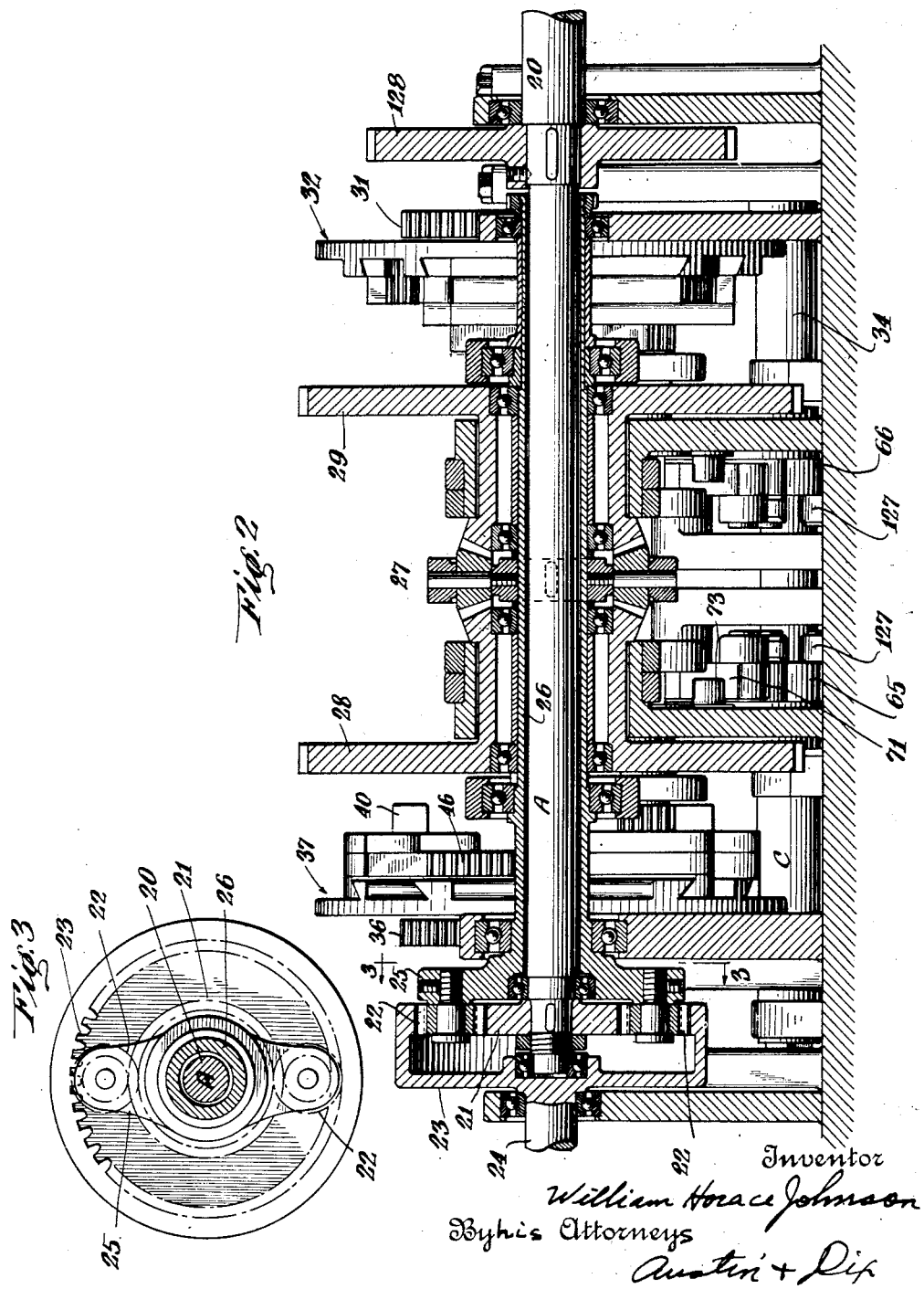

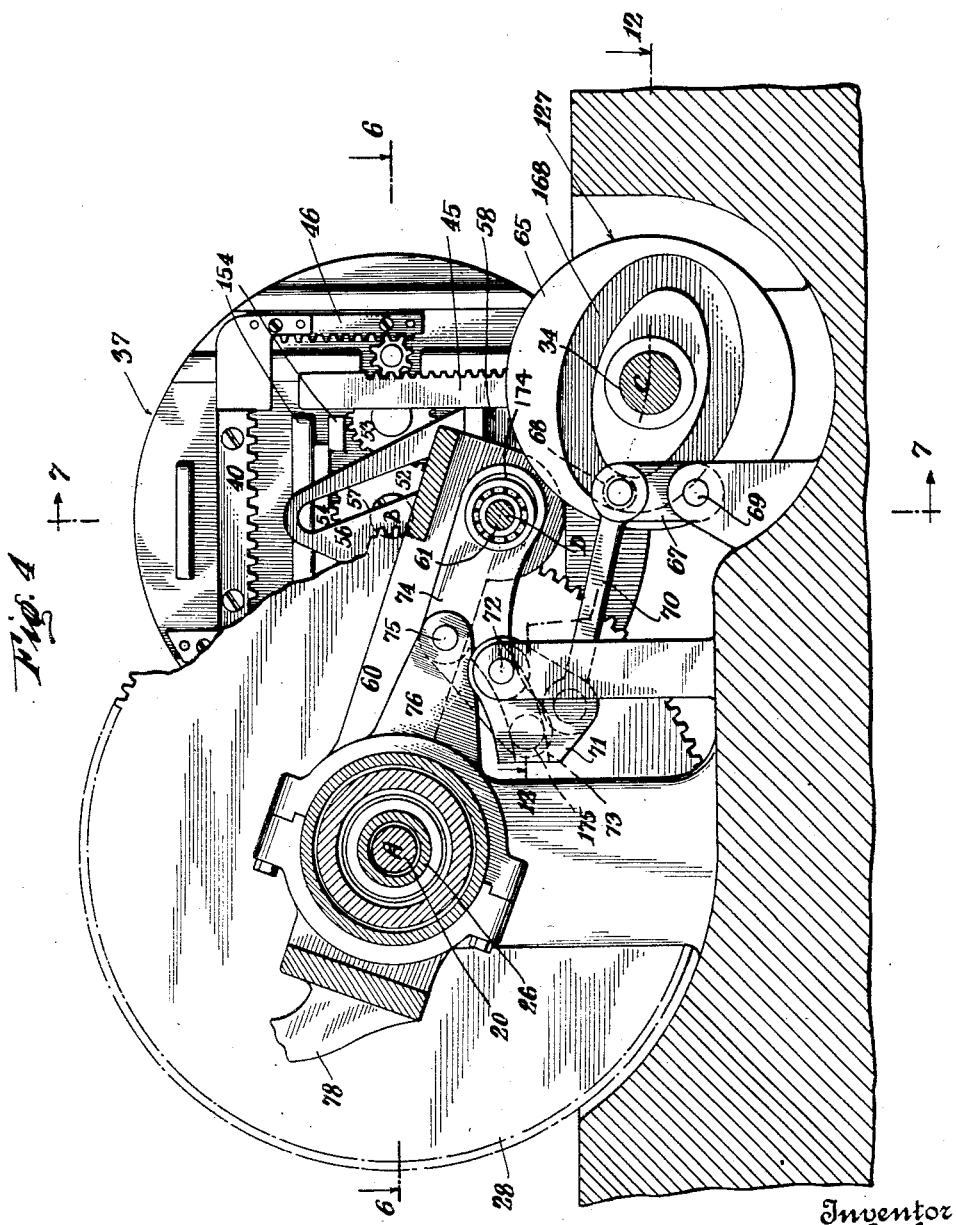

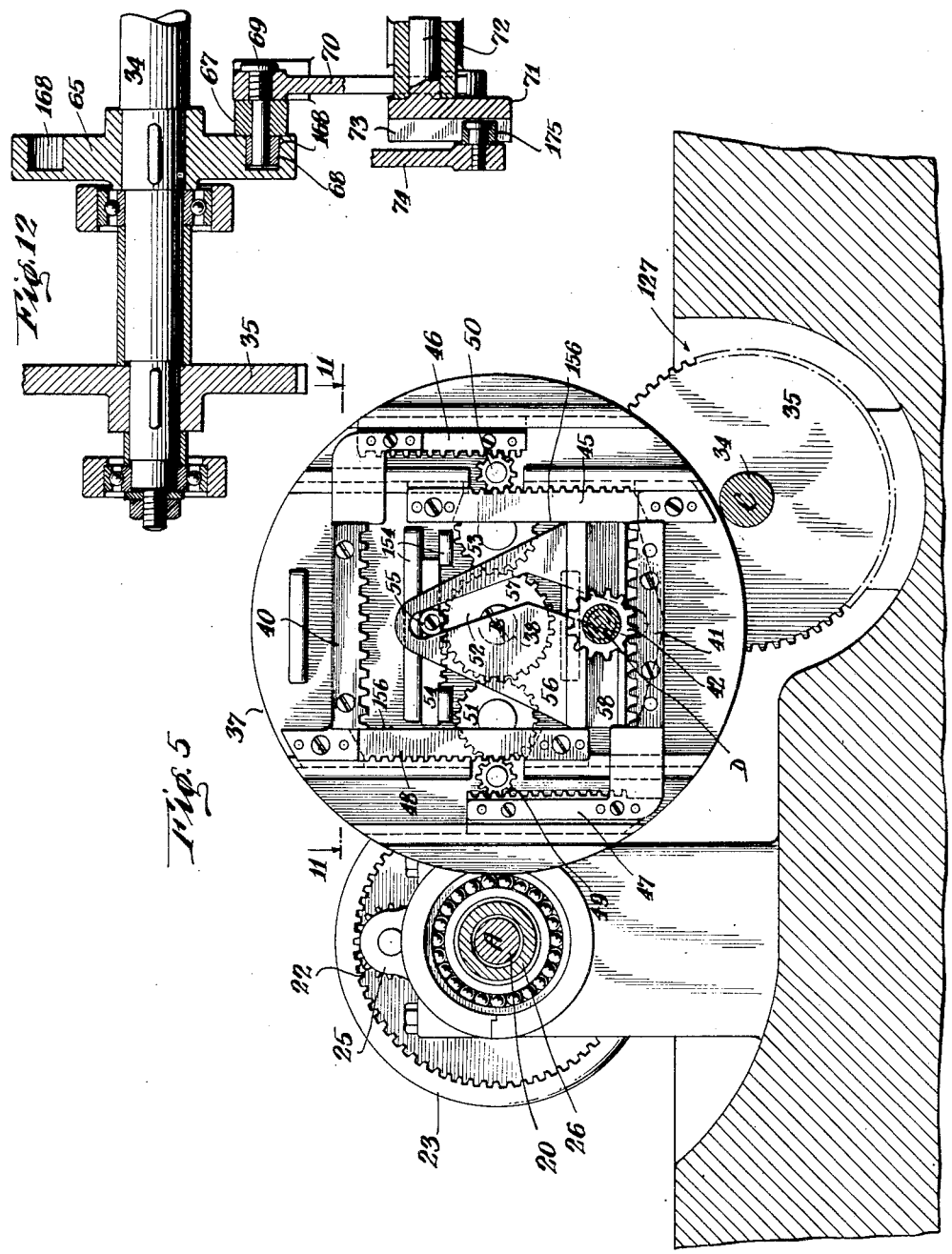

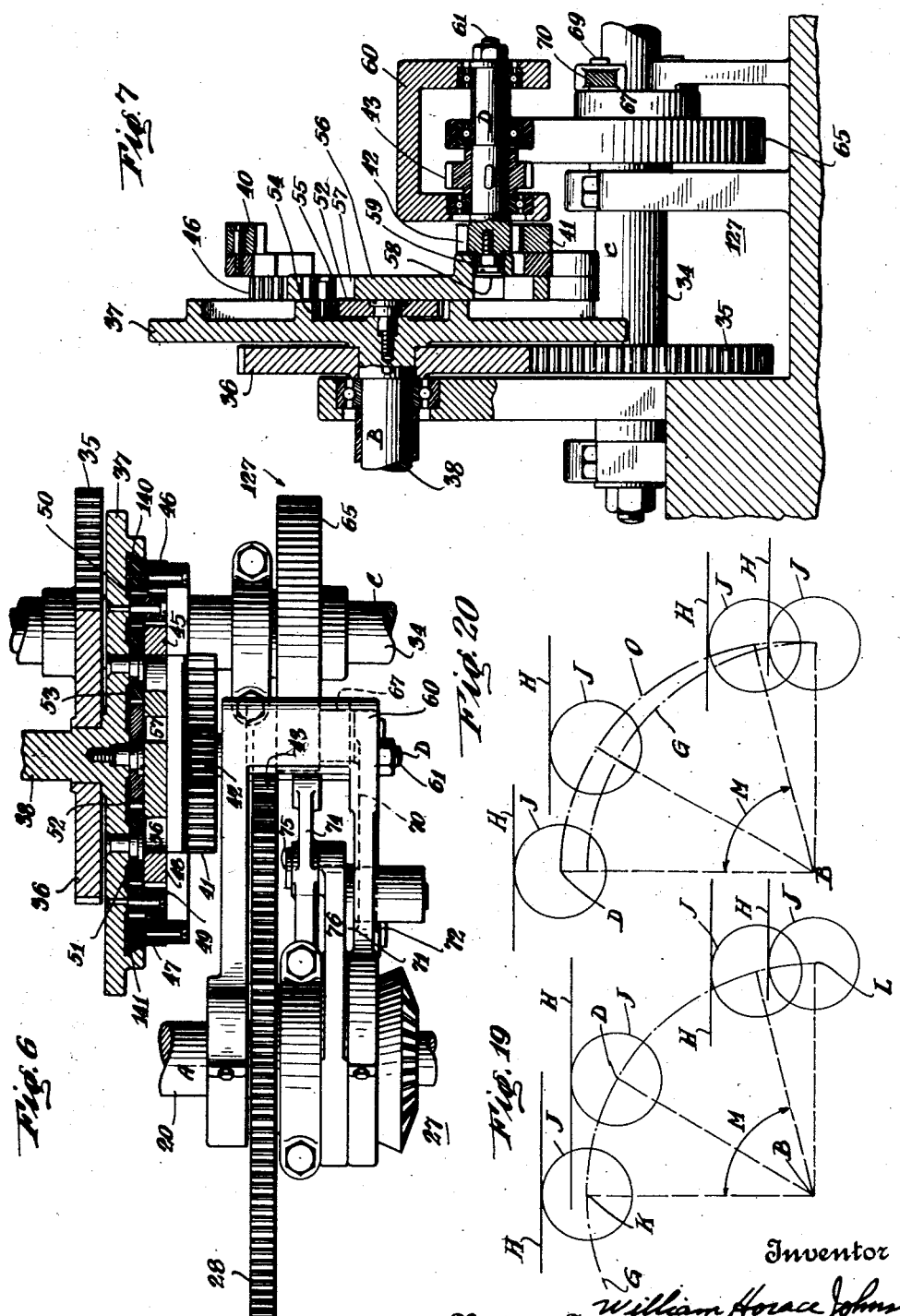

Dec. 12, 1933.   W. H. JOHNSON   1,938,594
SPEED CHANGE DEVICE
Filed April 8, 1931   7 Sheets-Sheet 6
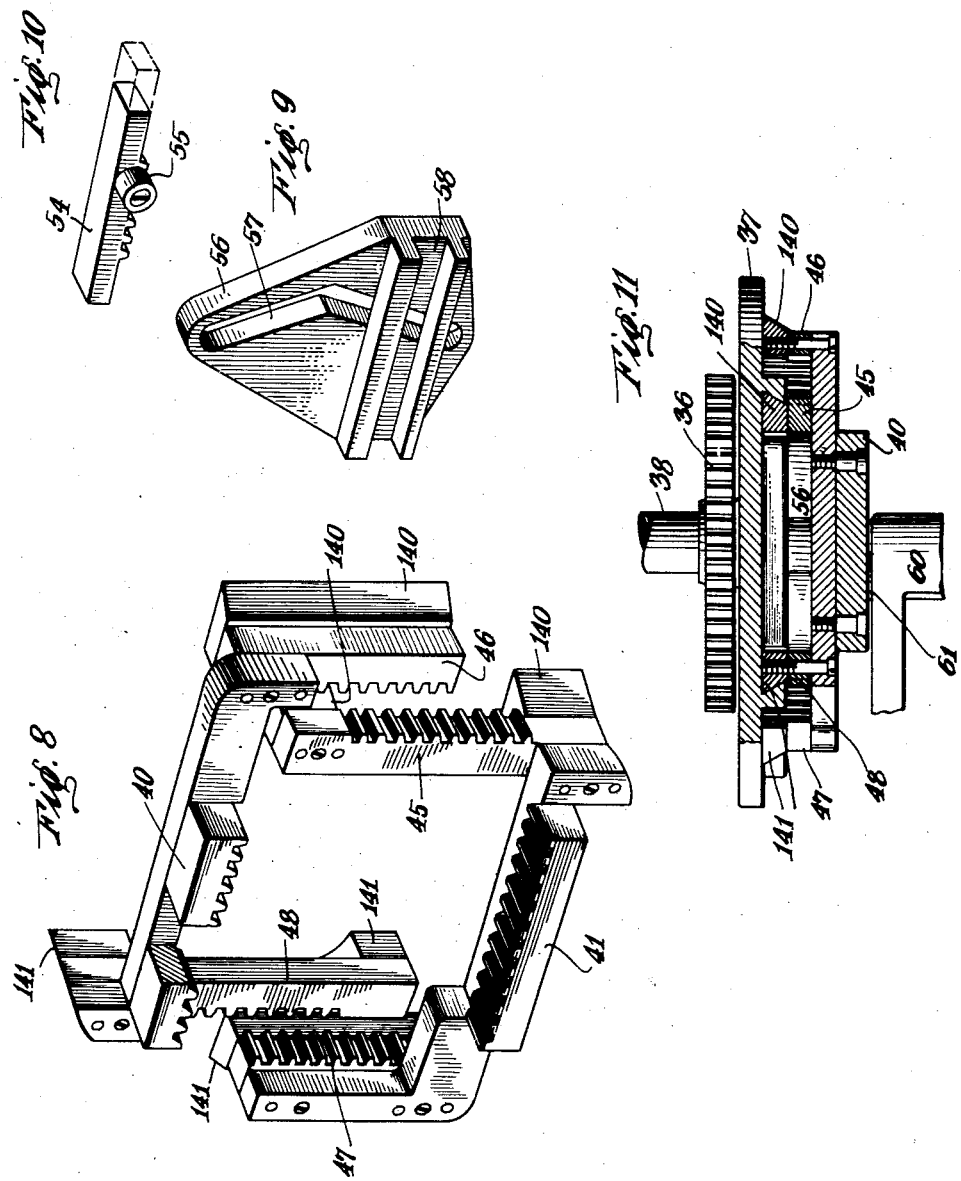
Inventor
William Horace Johnson
By his Attorneys
Austin + Dix Dec. 12, 1933.    W. H. JOHNSON    1,938,594
SPEED CHANGE DEVICE
Filed April 8, 1931    7 Sheets-Sheet 7
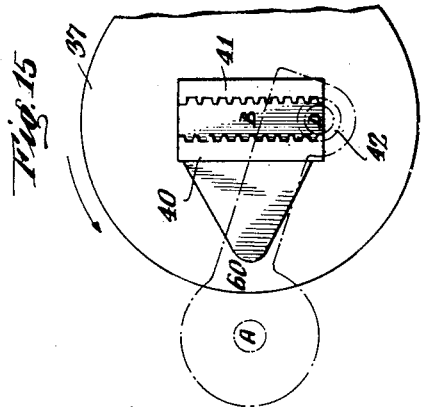
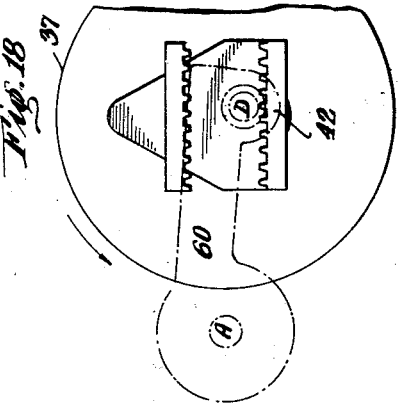
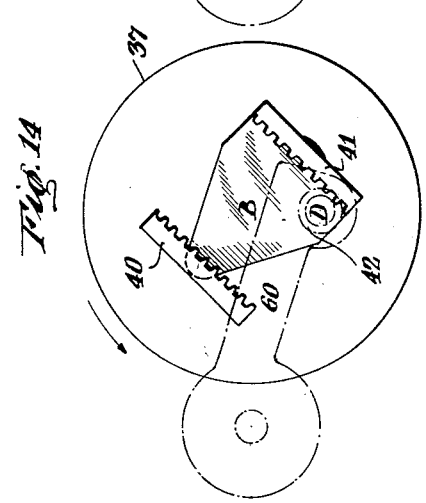
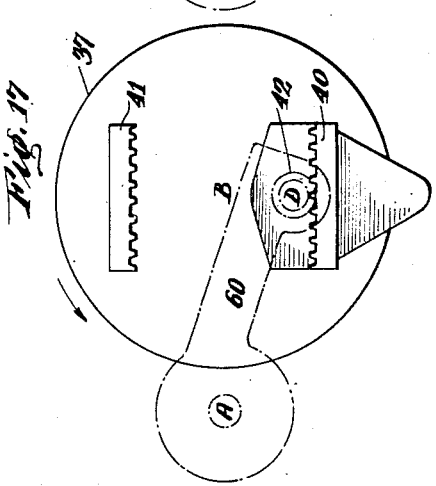
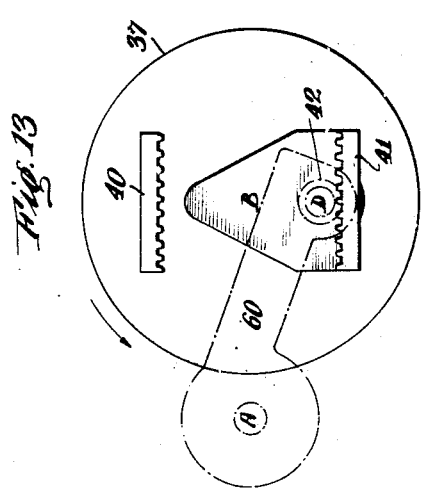
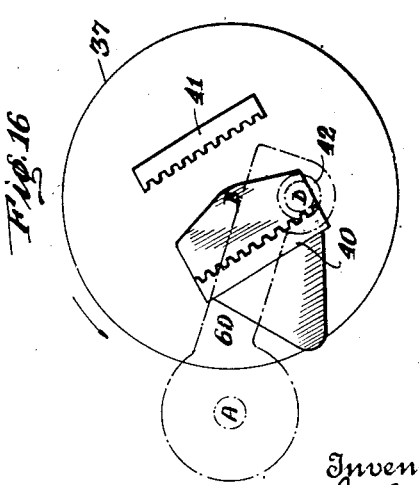
Inventor
William Horace Johnson
By his Attorneys
Austin & Dip Patented Dec. 12, 1933

1,938,594

UNITED STATES PATENT OFFICE 1,938,594

SPEED CHANGE DEVICE

William Horace Johnson, Cranston, R. I., assignor to Weskenson Corporation, a corporation of Rhode Island Application April 8, 1931. Serial No. 528,501

14 Claims. (Cl. 74—34)

The invention relates to change speed gearing.

According to the invention, a gearing arrangement is provided which can be manually controlled to give any desired speed ratio between driving and driven shafts without using any of the well known expedients for such work, as for instance, friction gears, slidable gears, slidable keys, etc. The gear ratio may be accurately controlled by shifting a single lever. This system is capable of general application but is particularly desirable for use with certain types of metal working machines and for automobile transmissions.

According to one form of the invention, the speed of the continuously rotating drive shaft is resolved into two variable speed components, the gear ratio of each of which may be varied. The variable components, as thus changed, are recombined to impart a substantially uniform speed to the driven shaft.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents a plan view of the change speed gearing accoording to the invention;

Figs. 2 and 3 are sections on the lines 2—2 and line 3—3, respectively, of Fig. 1 and Fig. 2;

Fig. 4 is a section on the line 4—4 of Fig. 1;

Fig. 5 is a section on the line 5—5 of Fig. 1;

Figs. 6 and 7 are sections on the line 6—6 and lines 7—7 of Fig. 4;

Figs. 8, 9 and 10 are respectively views of parts of the mechanism forming part of the rack plates;

Fig. 11 is a section taken on the line 11—11 of Fig. 5;

Fig. 12 is a section taken on the line 12—12 of Fig. 4;

Figs. 13 to 18, inclusive, are diagrammatic views illustrating the operation of the variable speed component mechanism;

Figs. 19 and 20 are diagrams for assisting in explaining the operation of the invention.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figs. 1, 2 and 3, 20 denotes the driving shaft and 24 the driven shaft. The drive shaft 20 drives a gear 21 which meshes with a plurality of pinions 22 mounted upon spider 25. These pinions 22 in turn mesh annular gear 23 which drives driven shaft 24. Throughout this explanation the letters A, B, C and D denote the several centers in the several views to assist in understanding the invention.

The spider 25 is mounted upon a sleeve 26 which is driven by a differential 27 which has variable speed components imparted to it through its gears 28 and 29, as will be hereinafter described more in detail.

The gear 128 on the driving shaft 20 drives a control mechanism indicated generally by 127 which controls the movement of differential gears 28 and 29 to determine the speed ratio between driving and driven shafts. It will be understood that, when the control sleeve 26 is driven at the same speed as driving shaft 20, all the parts of the planetary gear system 21, 22 and 23 are locked and the drive is direct with a one-to-one speed ratio.

It will be seen that, when the control sleeve 26 is rotated at some speed between zero and the same speed as the drive shaft 20 in the same direction therewith, depending upon the value of the gear chain, the driving shaft 20 will impart no motion to the driven shaft 24 and the gearing may be said to be in neutral. For purposes of description this will be called the "neutral" speed. It will be obvious that, when the control sleeve 26 is rotated at a higher speed than the neutral speed, the driven shaft 24 will be driven in the same direction as the driving shaft 20 at a speed ratio to the drive shaft 20 depending upon the speed of the control shaft 26. Furthermore, when the control shaft 26 is driven at a slower speed than the neutral speed, the driven shaft 24 will be rotated in the opposite direction to the driving shaft 20 and the gearing may be said to be in reverse. The control shaft 26 is always driven in the same direction as the drive shaft 20 in the arrangement shown.

Thus the control of the relative speed between the control sleeve 26 and driving shaft 20 determines the speed ratio of the system as a whole and the direction of drive of the driven shaft.

The control shaft 26 is driven through a gear chain as follows:

Gear 128 drives gear 30 on shaft 129. Mounted on shaft 129 is a rack plate 32 which drives gear 44 as described more in detail hereinafter which in turn drives the differential gear 29.

To drive the other differential gear 28, gear 31 mounted on shaft 129 drives gear 33 mounted on transfer shaft 34, in turn driving gear 35 which in turn drives gear 36 mounted on shaft 38, in turn driving a second rack plate 37 which in turn drives pinion 43, driving the other differential gear 28.

The drive between the rack plates 32 and 37 and gears 44 and 43 constitutes the variable speed mechanisms which resolve the constant speed of drive shaft 20 into variable speed components, the gear ratio of which is controlled by the adjustment lever 78 of Fig. 1. Since the construction of both variable speed component mechanisms is the same, a description of one will suffice for both.

Referring now to Figs. 5, 6, 7, 8, 9, 10 and 11, the rack plate 37 which is driven by shaft 38 has mounted thereon a pair of main racks 40 and 41 slidable in directions perpendicular to themselves. Connected to the main rack 40 and supporting it are secondary racks 46 and 48 and connected to main rack 41 and supporting it are secondary racks 45 and 47. These secondary racks operate to drive the main racks 40 and 41 back and forth toward and away from the center B and have shoes 140 and 141 riding in suitable ways. For driving the secondary racks 45, 46, 47 and 48 a plurality of gears 49, 50, 51, 52 and 53 are rotatably mounted upon the rack plate 37, meshing together, as indicated in Fig. 5. Gears 49 and 50 are extended and so shaped as to also mesh the secondary racks 47, 48 and 45, 46.

For driving the gear 52 a drive rack 54 is provided mounted in suitable ways 154 and having a roller 55 working in slot 57 of cam member 56 which is mounted to slide between and against racks 48 and 45 as indicated by 156. The cam member 56 has a slot 58 in which works a roller 59 (Fig. 7) mounted on shaft 61 upon which the gear 42 and the gear 43 meshing the differential gear 28 is also mounted. The main gear 42 engages the main racks 40 and 41 alternately to provide the variable speed transmission in a manner hereinafter explained more in detail. The shaft 61 is journalled in arm 60 which is suitably journalled to rotate about the center A.

Referring now to Figs. 13 to 18 for an explanation of the operation of the rack plate, it will be understood that the rack plate 37 rotates about the center B while the main pinion 42 rotates about the center D and is journalled in the arm 60 which is pivoted about the center A and held in substantially fixed position for any given speed ratio desired. This arm 60 is oscillated very slightly for a purpose hereinafter described, to give a more constant speed to the driven shaft 24, but this refinement is not necessary to a successful operation of the invention and for the purposes of the present explanation it will be assumed that the arm 60 is held stationary for a given speed ratio.

It will be seen that, as the rack plate 37 rotates in the direction of the arrow, and the main racks 40 and 41 approach each other through the mechanism above described, the rack 41 will stay in mesh with the main gear 42, assuming successively the positions shown in Fig. 14 and Fig. 15. In the latter figure both racks 40 and 41 are in mesh with the main pinion 42.

As the rack plate 37 continues to rotate in the direction shown, the racks 40 and 41 separate by the driving mechanism explained above, this time the main rack 40 remaining in mesh with the gear 42 until the position shown in Fig. 17 is obtained which constitutes a half turn from the position shown in Fig. 13.

It will be seen that with constant speed of the rack plate 37 a variable speed is imparted to the main gear 42 which varies from a maximum in Figs. 13 and 17 to a minimum or zero in Fig. 15. In other words the speed ratio of the main gear 42 will follow somewhat a simple, harmonic law. To change the average or composite speed ratio between rack plate 37 and gear 42 the arm 60 is moved to bring the gear 42 further away from or nearer the center B, another position being indicated in Fig. 18. It will be seen that the closer the main gear 42 is to the center B the less the speed imparted to it. It will be understood that as the arm 60 is moved nearer the center B the movement of the main racks 40 and 41 is also changed because of the operation of the rack driving mechanism above described.

It is thought that the theory of operation of the rack plate 37 and its associated mechanism will be clear from the description above. As the rack 37 rotates, the roller 59 on shaft 61 working in the way 58 of cam plate 56 will cause the cam plate 56 to oscillate back and forth, an amount depending upon the distance between centers B and D. The oscillation of cam plate 56 will cause the drive rack 54 to oscillate back and forth, which in turn drives the secondary racks 45, 46, 47 and 48, which in turn drive the main racks 40 and 41 back and forth to alternately engage the main gear 42, as above described.

The driving movement imparted to the main gear 42 is communicated to the gear 43 which drives the differential gear 28. On the other side a similar mechanism drives the other differential gear 29 through pinion 44. The variable speeds imparted to the differential gears 28 and 29 are combined in the mechanism of the differential 27 which is of standard construction to impart a substantially uniform rotation to the control sleeve 26. It will be understood that the racks on the rack plates 32 and 37 are always at 90 degree space relation so that, while maximum speed is being imparted to one differential gear 29, minimum speed is being imparted to the other differential gear 28.

The speed imparted to the driven shaft 24 will not be exactly uniform for reasons pointed out hereinafter by aid of diagrams illustrated in Figs. 19 and 20.

For most purposes, the speed will be sufficiently constant, but, if desired, an additional motion may be imparted to the differential gears 28 and 29 to make the combined speed imparted to the control shaft 26 and hence to the driven shaft 24 exactly constant.

Referring now to the diagrams shown in Figs. 19 and 20, in Fig. 19 the circle G represents the rack support 37. The lines H represent a rack 40 or 41, and the circles J represent the main pinion 42. For purposes of simplicity it will be assumed that the rack plate G is stationary while the pinions J rotate about it, as shown. The racks H will reciprocate back and forth but will have no rotation since it is assumed that the rack support G is stationary.

It is obvious that when the pinion and rack are in the position indicated by K the pinion will have maximum speed imparted thereto; while the pinion is in the position indicated by L no speed will be imparted thereto. In other words, the peripheral speed of the pinion will be proportional to the change in sine of the angle M from the position K.

The other variable speed component mechanism performs in the same way, but it is in 90 degree time relation to the first variable speed component mechanism. The differential 27 averages the variable speed of the pinions J.

Since the speed of each pinion varies according to a sine curve from maximum speed to zero, it can be proven theoretically and also experimentally that the average speed of the two pinions J at any instant is not always the same but will vary slightly. This will not interfere with the operation of the speed change mechanism for most purposes since the speed imparted to the control shaft 26 by the differential 27 is substantially constant. In some cases it may be desirable or necessary to have the speed imparted to the control shaft 26 absolutely constant.

Referring now to Fig. 20, in order to accomplish this the distance between the center B of the rack plate and the center D of the pinion is varied by mechanism hereinafter described so that the speed imparted to the pinion 42 will vary according to a straight line from maximum to zero. This arrangement provides that one half the sum of the speed of the pinion 42 of each variable speed component mechanism as combined by the differential 27 will be a constant. To accomplish this the distance between centers B and D is varied enough so that the said distance times the change in the sine of the angle M will vary according to a straight line from maximum speed to zero. This will cause the movement of the pinion J relative to the rack plate G to be represented by the line O instead of a circle.

Referring now to Figs. 4, 6 and 12, the mechanisms for imparting this corrective motion will be described. The mechanisms for imparting the corrective motions to the differential gears 28 and 29 are the same so a description of one will suffice for both. Mounted upon the transfer shaft 34 is a pair of cams 65 and 66, one for each motion correcting mechanism.

The cam 65 has a groove 168 therein in which rides the follower 68 which is pivoted to an arm 67 pivoted to a stationary point 69. A link 70 connects the follower 68 and a cam member 71 pivoted at 72 to a stationary part of the frame. The cam member 71 has a slot 73 which has a curvature on a circle of radius equal to the distance between the center A and pivot point 72.

This mechanism is for imparting a slight oscillatory motion to the arm 60 with respect to the control arm 76 which is connected to the adjustment lever 78, this adjustment lever 78 being connected to the control arm of both correcting mechanisms as shown in Fig. 1.

The control arm 76 has a bell crank lever 74 pivoted thereto at 75 and having a pin 175 riding in slot 73. The end of bell crank lever 74 is slotted at 174 and shaft 61 works in this slot. It will be gathered from the above that, as the cam 65 rotates, the bell crank lever 74 will impart a reciprocating motion to arm 60 and shaft 61 which in turn imparts an oscillatory motion to roller 59, main pinion 42 and gear 43.

Thus the correction mechanism above described varies the distance between the center of the rack support 37 and the center of pinion 42 periodically to impart a constant speed to the control shaft 26, as above described.

Thus a variable speed gearing system has been described in which the gear ratio or speed ratio between the drive shaft and the driven shaft and also the direction of rotation of the driven shaft can be controlled at will by merely setting a single lever without stopping the movement of the gearing and to obtain any speed ratio between one-to-one and one-to-zero or neutral.

It will be noted that the above system does not employ any of the usual expedients for changing speed, such as a friction drive, slidable gears, etc. The system, according to the invention, provides an infinitely graded speed ratio in contrast to systems commonly employed where the speed ratios can only be changed in steps. At the same time there is established at all times a complete chain of positive interlocking members transmitting the power from driving to the driven shaft. Furthermore, the device transmits uniformly a constant flow of power at all times.

While certain novel features of the invention have been disclosed and are pointed out in the annexed claims, it will be understood that various omissions, substitutions and changes may be made by those skilled in the art without departing from the spirit of the invention.

What is claimed is:

1. In speed change gearing, a first gear member having gear teeth and a fixed center of rotation, a second gear member having gear teeth meshing with said first gear teeth and also having a fixed center of rotation, and means for changing the distance between said first gear teeth and the center of rotation of said second gear member for different speed ratios.

2. In variable speed transmission, a first shaft, a rack-plate shaft driven by said first shaft, a second rack-plate shaft, a counter shaft driving said second rack-plate shaft and driven by said first rack-plate shaft, rack plates on said rack-plate shafts, each rack plate comprising a pair of parallel racks, means working said racks towards and away from each other, a pinion for each rack plate, each pinion engaging its racks alternately, a second shaft, a differential on said second shaft and having side gears in driving relation to said pinions, respectively.

3. In variable speed transmission, a first shaft, a rack-plate shaft driven by said first shaft, a second rack-plate shaft, a counter shaft driving said second rack-plate shaft and driven by said first rack-plate shaft, rack plates on said rack-plate shafts, each rack plate comprising a pair of parallel racks, means working said racks towards and away from each other, a pinion for each rack plate, each pinion engaging its racks alternately, a second shaft, a differential on said second shaft and having side gears in driving relation to said pinions, respectively, and correcting means for so changing the varying speed relation between said rack plates and pinions as to cause the resultant speed caused by said differential to be constant.

4. In variable speed transmission, a first shaft, a rack-plate shaft driven by said first shaft, a second rack-plate shaft, a counter shaft driving said second rack-plate shaft and driven by said first rack-plate shaft, rack plates on said rack-plate shafts, each rack plate comprising a pair of parallel racks, means working said racks towards and away from each other, a pinion for each rack plate, each pinion engaging its racks alternately, a second shaft, a differential on said second shaft and having side gears in driving relation to said pinions, respectively, arms centered in line with the main axis of said differential and carrying said pinions, cams carried by said counter shaft, and linkages connecting said cams and pinions to slightly move said pinions and arms to cause said second shaft to rotate at a constant speed.

5. In variable speed transmission, a first shaft, a rack-plate shaft driven by said first shaft, a second rack-plate shaft, a counter shaft driving said second rack-plate shaft and driven by said first rack-plate shaft, rack plates on said rack-plate shafts, each rack plate comprising a pair of parallel racks, means working said racks towards and away from each other, a pinion for each rack plate, each pinion engaging its racks alternately, a sleeve shaft surrounding said first shaft, a differential on said sleeve shaft and having side gears in driving relation to said pinions, respectively, arms centered on said sleeve shaft and carrying said pinions, cams carried by said counter shaft, and linkages connecting said cams and pinions to oscillate said pinion arms and pinions, and means for adjusting the distance between centers of said rack plates and said pinions to vary the gear ratio between said sleeve shaft and said first shaft.

6. In a change speed device, a transmission device comprising a rotary support, a pair of parallel racks on said support, a rotary gear in driving relation to said racks, means for causing said racks to move parallel to themselves toward and away from each other so that at least one rack is in mesh with said gear, and means for changing the relation of the centers of rotation of said gear and support to vary the gear ratio therebetween.

7. In a change speed device, a transmission device comprising a rotary support member, a pair of parallel racks on said support member, a rotary gear member in driving relation to said racks, means for causing said racks to move parallel to themselves toward and away from each other so that at least one rack is in mesh with said gear member, and means for changing the relation of the centers of rotation of said gear member and support member to vary the gear ratio therebetween, a second transmission device similar to said first transmission device having its support member geared to said first support member so that the racks thereof are in off-phase relation, means for imparting a constant speed to one set of said members of said transmission devices, and means for combining the output from the other set of members of said transmission devices.

8. In a change speed device, a transmission device comprising a rotary support, a pair of parallel racks on said support, a rotary gear in driving relation to said racks, means for causing said racks to move parallel to themselves toward and away from each other so that at least one rack is in mesh with said gear, and means for changing the relation of the centers of rotation of said gear and support to vary the gear ratio therebetween, a second transmission device similar to said first transmission device having its support geared to said first support so that the racks thereof are in 90° relation to the first racks, a differential connected to said gears, a first shaft connected to said supports, a second shaft connected to said differential, one of said shafts being the drive shaft, the other of said shafts being the driven shaft.

9. In combination, a driving shaft, a driven shaft and a variable speed transmission device between said shafts, said variable speed transmission device being made up of positively interlocking toothed gears as the sole and principal power transmitting medium, said gears providing exclusively a continuous interlocking power-transmitting chain between said shafts no matter what the speed ratio between said shafts, those teeth of said positively interlocking toothed gears which are transmitting power having continuous pitch line contact while transmitting said power.

10. In combination, a driving shaft, a driven shaft and a variable speed transmission device between said shafts, said variable speed transmission device being made up of positively interlocking toothed standard gears as the principal power transmitting medium and providing exclusively a continuous interlocking power-transmitting chain between said shafts, and means for controlling the speed ratio between said shafts without affecting the condition of continuous interlock between said shafts whereby a graded speed ratio between said shafts is obtained, those teeth of said positively interlocking toothed gears which are transmitting power having continuous pitch line contact while transmitting said power.

11. In combination, a driving shaft, a driven shaft and a variable speed transmission device between said shafts, said variable speed transmission device being made up of positively interlocking toothed gears as the principal power transmitting medium and providing exclusively a continuous interlocking power-transmitting chain between said shafts, and means for controlling at will the speed ratio between said shafts without affecting the condition of continuous interlock between said shafts, those teeth of said positively interlocking toothed gears which are transmitting power having continuous pitch line contact while transmitting said power.

12. In speed change gearing, a rotary support adapted to rotate about an operatively fixed center, a straight rack mounted on said support, a pinion meshing with said rack and adapted to rotate about an operatively fixed center, means for causing cyclic relative movement between said rack and said support to keep said rack and pinion in mesh as said support and pinion rotate about their own centers, and means for relatively shifting the operatively fixed centers of rotation to change the speed ratio between said support and pinion.

13. In speed change gearing, a rotary support adapted to rotate about an operatively fixed center, a gear member mounted on said support, a second gear member meshing with said first gear member and adapted to rotate about an operatively fixed center, means for causing cyclic relative movement between said first gear member and support to keep said gear members in mesh as said support and second gear member rotate about their own centers, and means for relatively shifting the operatively fixed centers of rotation to change the speed ratio between said support and second gear member.

14. In change speed apparatus, a rotary driving element, a rotary driven element, each element carrying standard gear teeth, means for maintaining teeth on said respective rotary elements continuously in meshing, power-transmitting, pitch line contact, and means for changing the average speed ratio of said rotary elements without affecting the continuous pitch line engagement of the power-transmitting teeth, whereby a graded and varied speed ratio between said rotary elements may be obtained.

WILLIAM HORACE JOHNSON.